United States Patent
Sato et al.

(10) Patent No.: US 8,318,837 B2
(45) Date of Patent: Nov. 27, 2012

(54) METHOD FOR CONTROLLING WATER RESISTANCE OF POLYGLYCOLIC ACID RESIN

(75) Inventors: Hiroyuki Sato, Iwaki (JP); Yuki Hokari, Nagoya (JP); Kazuyuki Yamane, Iwaki (JP); Fuminori Kobayashi, Iwaki (JP)

(73) Assignee: Kureha Corporation, Tokyo (JP)

( * ) Notice: Subject to any disclaimer, the term of this patent is extended or adjusted under 35 U.S.C. 154(b) by 99 days.

(21) Appl. No.: 12/085,388

(22) PCT Filed: Nov. 22, 2006

(86) PCT No.: PCT/JP2006/323301
§ 371 (c)(1),
(2), (4) Date: May 22, 2008

(87) PCT Pub. No.: WO2007/060981
PCT Pub. Date: May 31, 2007

(65) Prior Publication Data
US 2009/0298979 A1    Dec. 3, 2009

(30) Foreign Application Priority Data

Nov. 24, 2005  (JP) ................................. 2005-338304

(51) Int. Cl.
*C08K 5/00*  (2006.01)
*C08K 5/52*  (2006.01)
*C08G 63/02*  (2006.01)

(52) U.S. Cl. ........ 524/145; 524/139; 524/140; 524/141; 524/147; 528/271

(58) Field of Classification Search ............ 524/147, 524/145, 139, 140, 141, 195; 528/354, 272, 528/271
See application file for complete search history.

(56) References Cited

U.S. PATENT DOCUMENTS

| 7,179,868 B2 * | 2/2007 | Yamane et al. | 525/437 |
| 2007/0100037 A1 * | 5/2007 | Sato et al. | 524/115 |
| 2007/0244293 A1 * | 10/2007 | Sato et al. | 528/272 |

FOREIGN PATENT DOCUMENTS

| JP | 10-060137 | 4/1997 |
| JP | 2002-226691 | 1/2001 |
| JP | 2002-293905 | 3/2001 |
| JP | 2001-261797 | 9/2001 |
| JP | 2003-113228 | 10/2001 |
| JP | 2004-043637 | 7/2002 |
| JP | 2004-051729 | 7/2002 |
| WO | 03-037956 | 5/2003 |
| WO | WO 2004/033527 A1 | 4/2004 |
| WO | 2005-044894 | 5/2005 |

OTHER PUBLICATIONS

International Search Report of PCT/JP2006/323301 mailed Feb. 27, 2007.
International Preliminary Report on Patentability for PCT/JP2006/323301 dated May 27, 2008.

* cited by examiner

*Primary Examiner* — James J Seidleck
*Assistant Examiner* — Deve E Valdez
(74) *Attorney, Agent, or Firm* — Wenderoth, Lind & Ponack, L.L.P.

(57) ABSTRACT

A method of controlling a moisture resistance of polyglycolic acid resin, by controlling a total carboxyl group-source concentration including a contribution of residual glycolide. As a result, a moisture resistance governing the change of strength with time of the polyglycolic acid resin is controlled at a good accuracy.

13 Claims, 1 Drawing Sheet

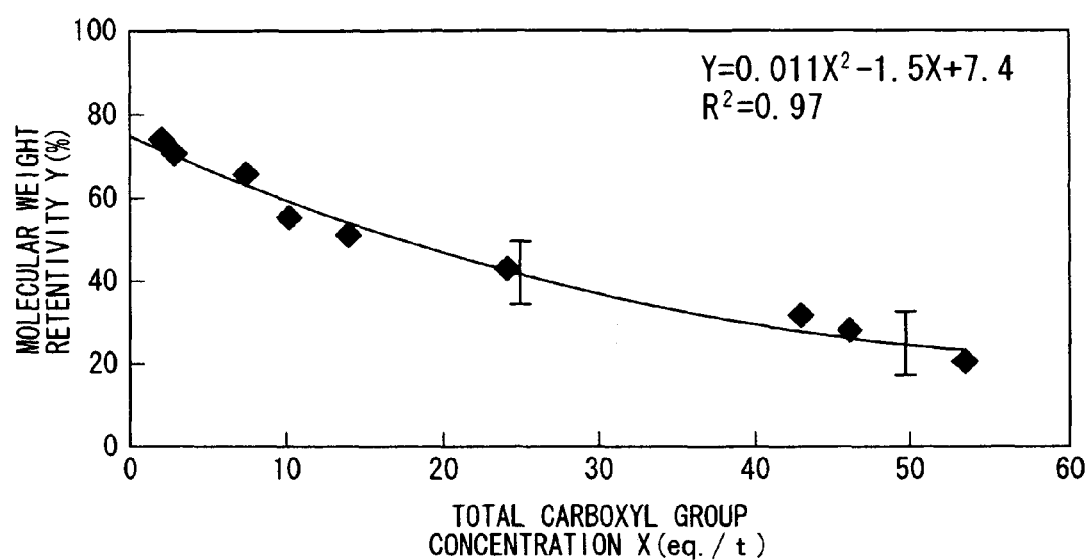

METHOD FOR CONTROLLING WATER RESISTANCE OF POLYGLYCOLIC ACID RESIN

TECHNICAL FIELD

The present invention relates to a method of controlling moisture resistance of polyglycolic acid resin as a biodegradable polymer material.

BACKGROUND ART

Aliphatic polyesters, such as polyglycolic acid and polylactic acid, have called attention as biodegradable polymer materials giving little load to the environment as they are decomposed by microorganism or enzyme present in nature, such as soil and sea water. Particularly, polyglycolic acid has excellent initial strength, degradability and absorptivity in bodies and is therefore utilized also as a medical polymer material for is surgical suture, artificial skin, etc.

For such use wherein the initial strength and biodegradability of polyglycolic acid resin are positively utilized, it is desired to control the initial strength and biodegradability at a high accuracy. As for the molecular weight directly governing the initial strength, the present inventors, et al., have found it possible to well control the molecular weight of polyglycolic acid resin by subjecting glycolide (cyclic ester) containing proton-source compounds inclusive of water and alcohol as initiators and molecular weight-adjusting agents based on a total proton concentration and a ratio (carboxylic acid/ester mol ratio) between a mol concentration of carboxyl (carboxylic acid)-source compounds including water and a mol concentration of alkoxy carbonyl (ester)-source compounds, as polymerization-controlling indexes, whereby a process for producing an aliphatic polyester has been proposed (Patent document 1 listed below). On the other hand, as for the biodegradability, there are individually known that it correlates directly with hydrolyzability and the hydrolyzability of an aliphatic polyester correlates with a terminal carboxyl concentration (Patent document 2 below) and that it correlates with a residual glycolide content (Patent document 3 below). However, there has not been a method of controlling the moisture resistance by considering the contribution of both terminal carboxyl group concentration and residual glycolide content.

Patent document 1: WO2005/044894A
Patent document 2: JP2001-261797A
Patent document 3: WO2005/090438A

DISCLOSURE OF INVENTION

Accordingly, a principal object of the present invention is to provide a method of controlling moisture resistance of polyglycolic acid resin at a good accuracy reflecting the contribution of both terminal carboxyl group concentration and residual glycolide, inclusively.

As a result of study with the above-mentioned object, the present inventors have confirmed the function of residual glycolide as an effective carboxyl group source and have found it possible to control the moisture resistance by controlling a total carboxyl group-source concentration including a contribution of residual glycolide.

Thus, according to the present invention, there is provided a method of controlling a moisture resistance of polyglycolic acid resin, comprising: controlling a total carboxyl group-source concentration including a contribution of residual glycolide.

More specifically, the present inventors have found that a molecular weight retentivity after standing under a normalized high moisture condition can be a good measure of moisture resistance of polyglycolic acid resin, and it has been made possible to control the moisture resistance of polyglycolic acid resin at a good accuracy by controlling the molecular weight retentivity. In more detail, a molecular weight retentivity after standing for 3 days in an environment of 50° C. and 90%-relative humidity is controlled according to formula (1) below:

$$Y = 0.011X^2 - 1.5X + 74 \qquad (1),$$

wherein X is a total carboxyl group concentration (equivalent/ton) determined as follows: X=glycolide content (wt. %)×54+terminal carboxyl group concentration.

BRIEF DESCRIPTION OF THE INVENTION

FIG. 1 is a graph showing a correlation between molecular weight retentivity (%) after 3 days of standing in an environment of 50° C. and 90%-relative humidity, and total carboxyl group concentration (equivalent/t).

BEST MODE FOR PRACTICING THE INVENTION (Polyglycolic Acid Resin)

The polyglycolic acid resin (hereinafter, sometimes referred to as "PGA resin") includes homopolymer of glycolic acid (PGA, inclusive of a ring-opening polymerization product of glycolide (GL) which is a bimolecular cyclic ester of glycolic acid) consisting only of glycolic acid recurring unit represented by a formula of —(O.CH$_2$.CO)—, and also a glycolic acid copolymer containing at least 70 wt. % of the above-mentioned glycolic acid recurring unit.

Examples of comonomers for providing the polyglycolic acid copolymer together with the glycolic acid monomer such as glycolide, may include: cyclic monomers, inclusive of ethylene oxalate (i.e., 1,4-dioxane-2,3-dione); lactides; lactones, such as β-propiolactone, β-butyrolactone; pivalolactone, γ-butyrolactone, δ-valerolactone, β-methyl-δ-valerolactone, and ε-caprolactone; carbonates, such as trimethylene carbonate; ethers, such as 1,3-dioxane; ether-esters, such as dioxanone; and amides, such as ε-caprolactam; hydroxycarboxylic acids, such as lactic acid, 3-hydroxypropanoic acid, 4-hydroxybutanoic acid and 6-hydroxycaproic acid, and their alkyl esters; substantially equal molar mixtures of aliphatic diols, such as ethylene glycol and 1,4-butane diol with aliphatic dicarboxylic acids, such as succinic acid and adipic acid, and their alkyl or aromatic esters; and two or more species of these. These monomers may be replaced by polymers thereof which can be used as a starting material for providing a polyglycolic acid copolymer together with the above-mentioned glycolic acid monomer such as glycolide.

The above-mentioned glycolic acid recurring unit should occupy at least 70 wt. %, preferably at least 90 wt. %, of the PGA resin. If the content is too small, the strength or the gas-barrier property expected of PGA resin becomes scarce. As far as this is satisfied, the PGA resin can comprise two or more species of polyglycolic acid (co)polymers in combination.

The PGA resin may preferably have a molecular weight (Mw (weight-average molecular weight based on polymethyl methacrylate) of $3 \times 10^4$-$8 \times 10^5$, particularly $5 \times 10^4$-$5 \times 10^5$, as measured by GPC measurement using hexafluoroisopropanol solvent. If the molecular weight is too small, the resultant form product is liable to have an insufficient strength. On the other hand, too large a molecular weight is liable to result in difficulties in melt-extrusion, forming and processing.

Anyway, an object of the present invention is to control the moisture resistance as represent by molecular weight retentivity after obtaining a polyglycolic acid resin having a molecular weight controlled to provide a desired initial strength, so that it is important to obtain a polyglycolic acid resin having a controlled molecular weight. For this purpose, it is preferred to adopt a process of subjecting glycolide (cyclic ester) containing proton-source compounds inclusive of water and alcohol as initiators and molecular weight-adjusting agents based on a total proton concentration and a ratio (carboxylic acid/ester mol ratio) between a mol concentration of carboxyl (carboxylic acid)-source compounds including water and a mol concentration of alkoxy carbonyl (ester)-source compounds, as polymerization-controlling indexes, as disclosed in the above-mentioned Patent document 1 (WO2005/044894A). As for more details of the process for producing a polyglycolic acid resin having a controlled molecular weight, the disclosure of WO2005/044894A will be relied on.

It is also important to control the residual glycolide contributing to the total carboxyl group concentration. For this purpose, it is preferred to adopt a method of controlling the residual glycolide content in a direction of reducing the residual glycolide content by producing polyglycolic acid resin (aliphatic polyester) by ring-opening polymerization of glycolide (cyclic ester), wherein a latter period of polymerization is proceeded with by way of solid-phase polymerization, and the resultant polyglycolic acid resin (aliphatic polyester) is subjected to removal of residual glycolide (cyclic ester) by release to a gas phase, as generally disclosed in Patent document 3 (WO2005/090438A). As for more details of the process for producing polyglycolic acid resin with a controlled residual glycolide content, the disclosure of WO2005/090438A will be relied on.

In order to control the moisture resistance (molecular weight-retentivity) of polyglycolic acid resin according to the method of the present invention, it is necessary to control the terminal carboxyl concentration principally contributing to the total carboxyl group concentration in addition to the residual glycolide content. For this purpose, in addition to the control of the terminal carboxyl concentration produced during the ring-opening polymerization, e.g., according to the process of the above-mentioned Patent document 1, it is preferred to form a polyglycolic acid resin composition having a controlled terminal carboxyl concentration in a direction of generally reducing the terminal carboxyl concentration by adding a carboxyl group-capping agent to the resultant polyglycolic acid resin.

As the carboxyl group-capping agent, it is generally possible to use compounds having a function of capping a carboxyl terminal and known as an agent for improving moisture resistance of aliphatic polyesters, such as polylactic acid. Examples thereof may include: carbodiimide compounds inclusive of monocarbodiimides and polycarbodiimides, such as N,N-2,6-diisopropylphenylcarbodiimide; oxazoline compounds, such as 2,2'-m-phenylene-bis(2-oxazoline), 2,2'-p-phenylene-bis(2-oxazoline), 2-phenyl-2-oxazoline, and styrene-isopropenyl-2-oxazoline; oxazine compounds, such as 2-methoxy-5,6-dihydro-4H-1,3-oxazine; and epoxy compounds, such as N-glycidylphthalimide, cyclohexene oxide, and tris (2,3-epoxypropyl) isocyanurate. Among these, carbodiimide compounds and epoxy compounds are preferred. These carboxyl group-capping agents can be used in combination of two or more species as desired, and may preferably be used in a proportion of 0.01-10 wt. parts, further preferably 0.1-2 wt. parts, particularly preferably 0.2-1 wt. part, per 100 wt. parts of the PGA resin.

In the present invention, a total carboxyl group concentration is determined by including a contribution of the residual glycolide in addition to the terminal carboxyl concentration controlled in the above-described manner. According to the present inventors' knowledge, glycolide (abbreviated as "GL") is successively converted into glycolic dimer (abbreviated as "GA2") and then to glycolic acid (abbreviated as "GA") by hydrolysis according to formulae (3) and (4) below:

$$GL + H_2O \rightarrow GA2 \quad (3)$$

$$GA2 + H_2O \rightarrow 2GA \quad (4)$$

Herein, the reaction of formula (3) is faster than the reaction of formula (4) by far (about 20 times), the residual glycolide behaves substantially as glycolic acid dimer (GA2) in terms of a carboxyl group source, and it has been experimentally confirmed that the GA2 shows a dissociation rate of ca. 62.5% similarly as glycolic acid (GA). Accordingly in view of a molecular weight: 116 of glycolide, a carboxyl group concentration given by the contribution of residual glycolide content in 1 t (ton) of polyglycolic acid resin is calculated as follows.

(glycolide content(wt. %)/100)×(10$^6$/116)×0.625 = (glycolide content(wt. %)/100)×5400.

Accordingly, as a total with the terminal carboxyl concentration, the total carboxyl group concentration X (equivalent/t) is calculated as follows:

$$X = \text{glycolide content(wt. \%)} \times 54 + \text{terminal carboxyl concentration} \quad (2)$$

Then, according to the present inventors' further study, the thus-calculated total carboxyl group concentrations X (eq./t) and molecular weight-retentivities Y (%) measured in Examples 1-9 gave results as shown in Table 1 appearing hereinafter, and a good correlation as shown in FIG. 1 was attained between them according to a quadratic function formula show below:

$$Y = 0.011X^2 - 1.5X + 74 \quad (1)$$

Accordingly, the moisture resistance of polyglycolic acid resin can be controlled at a good accuracy by controlling the total carboxyl group concentration through a control of the residual glycolide and terminal carboxyl concentration in the above-described manner so as to provide a desired value of molecular weight-retentivity Y (%) which is a good measure of moisture resistance.

Thus, the moisture resistance of polyglycolic acid resin as a material resin can be controlled by controlling the total carboxyl group concentration. Further, the moisture resistance of a polyglycolic acid resin product can be controlled in a direction of enhancing the moisture resistance, e.g., by providing an increased crystallinity through heat treatment, etc. or by providing an enhanced molecular orientation through stretching.

To a polyglycolic acid resin (composition) obtained through the method of controlling the moisture resistance of polyglycolic acid resin (or a process for providing a polyglycolic acid resin (composition) with a controlled moisture resistance, from another viewpoint), it is preferred to also add a thermal stabilizer for improving the thermal stability in heat-forming or a palletizing step preceding it, in addition to the above-mentioned carboxyl group-capping agent for controlling the terminal carboxyl concentration.

Preferred examples of the thermal stabilizer may include: phosphoric acid esters having a pentaerythritol skeleton, such as cyclic neopentane-tetra-il-bis(2,6-di-tert-butyl-4-methylphenyl) phosphite, cyclic neopentane-tetra-il-bis(2,4-di-tert-butylphenyl) phosphite, and cyclic neopentane-tetra-il-bis(octadecyl) phosphite, alkyl phosphates or alkyl phosphites having an alkyl group of preferably 8-24 carbon atoms mono- or di-stearyl acid phosphate or a mixture of these; and metal carbonates, such as calcium carbonate and strontium carbonate. The structures of these thermal stabilizers are disclosed in WO2003/037956A1, if necessary. These thermal stabilizers may preferably be used in a proportion of at most 3 wt. parts, more preferably 0.003-1 wt. part, most preferably 0.01-0.05 wt. part, per 100 wt. parts of aliphatic polyester. By adding such a thermal stabilizer to a PGA resin composition, depolymerization of the PGA resin during the glycolide elimination step is suppressed so that the control of residual glycolide in a direction of reducing it becomes easier.

According to the method of the present invention, the above-mentioned PGA resin composition is subjected to melting (and mixing) by heating to a temperature range of preferably 230-280° C., more preferably 240-270° C. The melting (and mixing) means may basically be any one, inclusive of a stirring machine and a continuous kneader, but may preferably comprise an extruder (e.g., an equi-directionally rotating twin-screw extruder) allowing a short-time processing and a smooth transfer to a subsequent cooling step for the heat-melting (and mixing) therein. If the heat-melting temperature is below 230° C., the effect of additives, such as the carboxyl group-capping agent and thermal stabilizer, is liable to be insufficient. On the other hand, in excess of 280° C., the PGA resin composition is liable to be colored.

It is possible to use a filler in order to impart a mechanical strength and other properties to the PGA resin composition. The filler is not particularly limited in species but may be in the form of fiber, plates, powder or particles. Specific examples thereof may include: fiber or whisker form fillers, such as glass fiber, PAN-based and pitch-based carbon fiber metal fiber, such as stainless steel fiber, aluminum fiber and brass fiber, natural fiber of chitin, chitosan, cellulose, cotton, etc., organic synthetic fiber such as aromatic polyamide fiber, gypsum fiber, ceramic fiber, asbestos fiber, zirconia fiber, alumina fiber, silica fiber, titanium oxide fiber, silicon carbide fiber, rock wool, potassium titanate whisker, barium titanate whisker, aluminum borate whisker, and silicon nitride whisker; and powdery, particulate and plate-like fillers of natural inorganic minerals, such as mica, talc, kaolin, silica and sand, calcium carbonate, glass beads, glass flake, glass micro-balloon, clay, molybdenum disulfide, wallastenite, montmorillonite, titanium oxide, zinc oxide, calcium polyphosphate and graphite. Any type of glass fiber can be used without particular restriction as far as it is generally usable for reinforcement of resins, and can be selected from chopped strands of long fiber type and short fiber type, and milled fiber. The above-mentioned fillers can be used in two or more species in combination. Incidentally, these fillers can be used after surface treatment thereof with known coupling agents, such as silane coupling agents and titanate coupling agents, and other surface treating agents. Further, the glass fiber can be coated or bundled with a thermoplastic resin, such as ethylene/vinyl acetate copolymer, or a thermosetting resin such as epoxy resin. The filler may be added in 0.1-100 wt. parts, preferably 1-50 wt. parts, per 100 wt. parts of the PGA resin.

EXAMPLES

Hereinbelow, the present invention will be described more specifically based on Examples and Comparative Examples. The physical properties (or values) described in the present specification including the following description are based on those measured according to the following methods.

(1) Glycolide Content

To ca. 100 mg of a sample PGA resin (composition), 2 g of dimethyl sulfoxide containing 4-chlorobenzophenone as an internal standard at a concentration of 0.2 g/l, was added, and the mixture was heated at 150° C. for ca. 5 min. to dissolve the resin and, after being cooled to room temperature, was subjected to filtration. Then, 1 µl of the filtrate solution was taken and injected into a gas chromatography (GC) apparatus for measurement. From a value obtained from the measurement, a glycolide content was calculated in terms of wt. % contained in the polymer. The GC analysis conditions were as follows.

Apparatus: "GC-2010" made by K. K. Shimadzu Seisakusho)
Column: "TC-17" (0.25 mm in diameter×30 mm in length).
Column temperature: Held at 150° C. for 5 min., heated at 270° C. at a rate of 20° C./min. and then held at 270° C. for 3 min.
Gasification chamber temperature: 180° C.
Detector: FID (hydrogen flame ionization detector) at temperature of 300° C.

(2) Molecular Weight Measurement

From a pressed sheet-form sample, ca. 10 mg of a sample was cut out and dissolved in 0.5 ml of dimethyl sulfoxide at 150° C., immediately followed by cooling to room temperature. Further, the sample solution was dissolved in 10 ml of hexafluoroisopropanol (HFIP) containing sodium trifluoroacetate dissolved therein at 5 mM. Then, 20 µl of the resultant sample solution was filtrated through a 0.1 µm-membrane filter made of polytetrafluoroethylene and then injected into a gel permeation chromatography (GPC) apparatus for measurement of molecular weight under the following conditions. Incidentally, the sample was injected into the GPC apparatus within 30 minute after the dissolution.

<GPC Measurement Conditions>
Apparatus: "Shodex-104" made by Showa Denko K. K.
Column: Two columns of "HFIP-606M" were connected in series with 1 column of "HFIP-G" as a pre-column.
Column temperature: 40° C.
Elution liquid: HFIP solution containing sodium trifluoroacetate dissolved at 5 mM.
Flow rate: 0.6 ml/min.
Detector: RI (differential refractive index) detector.
Molecular weight calibration: Effected by using 5 species of standard polymethyl methacrylate having different molecular weights.

(3) Terminal Carboxyl Group Concentration and Total Carboxyl Group Concentration From a pressed sheet prepared in the same manner as for evaluation of Moisture resistance, a sample was cut, accurately weighed at ca. 0.3 g and completely dissolved in 10 ml of special reagent-grade dimethyl sulfoxide on an oil bath at 150° C. within ca. 3 min. To the solution, 2 drops of an indicator (0.1 wt. % Bromothymol Blue/alcohol solution) were added, and then 0.02-normal sodium hydroxide/benzyl alcohol solution was added dropwise until a terminal point when the color of the solution turned from yellow to green by observation with eyes. From the dropped amount at that point, a terminal carboxyl group concentration was calculated in terms of equivalents per 1 t (ton) of PGA resin.

Then, in the above-described manner, from the glycolide content obtained in section (1) above and the above-measured terminal carboxyl concentration, a total carboxyl group concentration X was calculated based on formula (2) shown below (shown again):

$$X = \text{glycolide content(wt. \%)} \times 54 + \text{terminal carboxyl concentration} \quad (2)$$

(4) Moisture Resistance (Molecular Weight-Retentivity)

Ca. 1 g of a pellet sample was sandwiched between aluminum plates and heated for 3 minutes on heat press machine at 260° C. Then, the sample was held for 1 minute under a pressure of 5 MPa and then immediately transferred to a press machine cooled with circulating water to be cooled to form a transparent amorphous press sheet. The press sheet thus formed was then heat-treated for 10 minutes at 80° C. in the state of being sandwiched between the aluminum plates.

Ca. 10 mg of a sample was cut out from the press sheet prepared through the above operation and held for 3 days in a constant temperature and humidity chamber held at a temperature of 50° C. and relative humidity of 90%. The sample was taken out after the 3 days and measured with respect to a molecular weight by gel permeation chromatography (GPC). A molecular weight retentivity was calculated from the measured molecular weight and a molecular weight of sample before being placed in the constant temperature and humidity chamber, and a moisture resistance was evaluated based on the molecular weight retentivity.

PGA Synthesis Examples, PGA Extrusion Examples and Heat treatment methods performed for preparing PGA resin samples having various residual glycolide contents and terminal carboxyl concentrations (and accordingly total carboxyl group concentrations) are described below.

PGA Synthesis Example 1

Into a SUS-made vessel equipped with a steam jacket structure and a stirrer, 450 kg of glycolide (made by Kureha Corporation, containing 360 ppm of glycolic acid dimer and 13 ppm of water) and 1600 g of n-dodecyl alcohol were added, then 13.5 g (30 ppm) of tin chloride dihydrate was added and, after closing the vessel, steam was circulated in the jacket under stirring of the contents to heat the contents up to 100° C. The contents became a uniform liquid in the course of the heating. While the temperature was held at 100° C., the contents were transferred to an apparatus comprising metal (SUS304)-made tubes each having an inner diameter of 28 mm and, immediately after completion of the transfer, an upper lid was affixed to the apparatus. A heating medium oil at 170° C. was circulated to the body of the apparatus for 7 hours, and lumps of polyglycolic acid (PGA) were obtained and pulverized by a pulverizer.

The thus-obtained PGA pulverizate was placed in a drier, to which dry air showing a dew point of −50° C. was blown in, and dried at 120° C. for 12 hours.

PGA Synthesis Example 2

A PGA pulverizate was obtained in the same manner as in PGA Synthesis Example 1 except for adding 155 g of water instead of 1600 g of n-dodecyl alcohol.

PGA Extrusion Example 1

To a PGA pulverizate were respectively added a nearly equi-molar mixture of mono- and de-stearyl acid phosphate (trade name: "ADEKASTAB AX-71", made by Asahi Denka Kogyo K. K.) (as a thermal stabilizer) at 300 ppm with respect to PGA and N,N-2,6-diisopropyl-phenylcarbodiimide (CDI, made by Kawaguchi Kagaku Kogyo K. K.). (as a carboxyl group-capping agent) at 0.5 wt. % with respect to PGA. The resultant mixture was extruded through a twin-screw extruder under the following conditions to obtain PGA pellets.

(Extrusion Conditions)

Extruder: "LT-20", made by K. K. Toyo Seiki Seisakusho

Temperature set condition: The temperatures of zones C1-C4 from the feed port to the discharge port were sequentially set to 220° C., 230° C., 240° C. and 230° C.

PGA Extrusion Example 2

PGA pellets were obtained in the same manner as in PGA Extrusion Example 1 except for omitting the addition of the carboxyl group-capping agent CDI.

PGA Extrusion Example 3

PGA pellets were obtained in the same manner as in PGA Extrusion Example 1 except for adding 300 ppm with respect to PGA of cyclic neopentane-tetra-il-bis(octadecyl phosphite) (trade name: "ADEKASTAB PEP-8", made by Asahi Denka Kogyo K. K.) instead of "AX-71".

PGA Extrusion Example 4

PGA pellets were obtained in the same manner as in PGA Extrusion Example 1 except for adding 0.5 wt. % of glycolic acid in addition to the 300 ppm with respect to PGA of "AX-71" and 0.5 wt. % with respect to PGA of the CDI added similarly as in PGA Extrusion Example 1.

[Heat Treatment Method 1]

PGA pellets were placed in a 50 ml-threaded mouth bottle to which a polytetrafluoroethylene-made tube supplying 50 ml/min. of nitrogen therethrough was inserted. The bottle in this state was placed in a drier ("MINIJET OVEN", made by Toyama Sangyo K. K.) and heat-treated at 220° C. for a prescribed period. Then, the bottle was cooled while continuing the blowing-in of nitrogen to room temperature, thereby recovering a pellet sample.

[Heat Treatment Method 2]

PGA pellets were placed in a 50 ml-threaded mouth bottle to which a polytetrafluoroethylene-made tube supplying 50 ml/min. of nitrogen therethrough was inserted. The bottle in this state was placed in a drier ("MINIJET OVEN", made by Toyama Sangyo K. K.) and heat-treated at 170° C. for a prescribed period. Then, the bottle was cooled while continuing the blowing-in of nitrogen to room temperature, thereby recovering a pellet sample.

Various PGA pellets were prepared according to the following Examples by combining the above-mentioned Synthesis Examples, Extrusion Examples and Heat treatment methods.

Example 1

The PGA pulverizate obtained in PGA Synthesis Example 1 was pelletized according to the method of PGA Extrusion Example 1 to obtain PGA pellets.

The PGA pellets were treated for 6 hours according to Heat treatment method 1 to recover PGA pellets.

Physical properties of the thus-obtained PGA pellets are shown in Table 1 together with the results of Examples 2-9 described below.

Example 2

The PGA pulverizate obtained in PGA Synthesis Example 1 was pelletized according to the method of PGA Extrusion Example 1 to obtain PGA pellets.

The PGA pellets were treated for 5 hours according to Heat treatment method 1 to recover PGA pellets.

Example 3

The PGA pulverizate obtained in PGA Synthesis Example 1 was pelletized according to the method of PGA Extrusion Example 1 to obtain PGA pellets.

The PGA pellets were treated for 17 hours according to Heat treatment method 2 to recover PGA pellets.

Example 4

The PGA pulverizate obtained in PGA Synthesis Example 1 was pelletized according to the method of PGA Extrusion Example 2 to obtain PGA pellets.

The PGA pellets were treated for 6 hours according to Heat treatment method 1 to recover PGA pellets.

Example 5

The PGA pulverizate obtained in PGA Synthesis Example 1 was pelletized according to the method of PGA Extrusion Example 1 to obtain PGA pellets.

Example 6

The PGA pulverizate obtained in PGA Synthesis Example 1 was pelletized according to the method of PGA Extrusion Example 2 to obtain PGA pellets.

Example 7

The PGA pulverizate obtained in PGA Synthesis Example 1 was pelletized according to the method of PGA Extrusion Example 3 to obtain PGA pellets.

Example 8

The PGA pulverizate obtained in PGA Synthesis Example 2 was pelletized according to the method of PGA Extrusion Example 3 to obtain PGA pellets.

Example 9

The PGA pulverizate obtained in PGA Synthesis Example 2 was pelletized according to the method of PGA Extrusion Example 4 to obtain PGA pellets. The PGA pellets were treated for 17 hours according to Heat treatment method 2 to recover PGA pellets.

The physical properties of the PGA pellets obtained in the above Examples 1-9 are inclusively shown in Table 1 below. The above-mentioned formula (1) is based on the data of molecular weight-retentivities Y and total carboxyl group concentrations X of Examples 1-9 shown in Table 1 and has been obtained through determination of coefficients of a quadratic function formula with respect to X according to the least square method, whereby a good correlation has been obtained as represented by a correlation coefficient of $R^2=0.97$. Table 1 shows the measured values of molecular weight retentivities Y and also estimated values thereof according to the formula (1).

moisture resistance evaluation method, which are inclusively shown in Table 2 together with the result of Examples described below.

Example 11

The PGA pulverizate obtained in PGA Synthesis Example 1 was pelletized according to the method of PGA Extrusion Example 2 to obtain PGA pellets.

The thus-obtained PGA pellets exhibited a terminal carboxyl group concentration of 7 eq./ton and a glycolide content of 0.24 wt. %. In order to obtain a PGA product showing a molecular weight-retentivity of 60%, the PGA pellets were heat treated for 24 hours according to Heat treatment method 2.

Example 12

A PGA product (PGA pellets) was prepared in the same manner as in Example 11 except that the heat-treatment time was changed to 12 hours.

The properties of the resultant PGA pellets measured in the same manner as in Examples 9-11 are inclusively shown in Table 2 below.

The results of Examples 10 and 11 show that actual molecular weight-retentivities close to the target molecular weight-retentivity of 60% can be obtained according to the formula (1) even at different terminal carboxyl group concentrations and residual glycolide levels. Example 12 is presented as an example showing a substantially lower molecular weight-retentivity because of an increased residual glycolide content even at a terminal carboxyl group concentration identical to that in Example 11.

TABLE 1

| | | Example | | | | | | | | |
|---|---|---|---|---|---|---|---|---|---|---|
| | | 1 | 2 | 3 | 4 | 5 | 6 | 7 | 8 | 9 |
| Glycolide content | (wt. %) | 0.02 | 0.03 | 0.1 | 0.02 | 0.19 | 0.17 | 0.63 | 0.3 | 0.07 |
| Terminal carboxyl group concentration | (eq./t) | 1 | 1 | 2 | 9 | 4 | 15 | 9 | 30 | 50 |
| Total carboxyl group concentration | (eq./t) | 2 | 3 | 7 | 10 | 14 | 24 | 43 | 46 | 54 |
| Initial molecular weight (Mw) | ($\times 10^4$) | 21.4 | 20.8 | 21.5 | 21.3 | 21.8 | 20.7 | 18.4 | 20.6 | 21.4 |
| Molecular weight after 3 days (Mw) | ($\times 10^4$) | 15.7 | 14.6 | 14.2 | 11.6 | 11.4 | 9.1 | 6.3 | 6.0 | 4.5 |
| Molecular weight retentivity (measured) | (%) | 73 | 70 | 66 | 54 | 52 | 44 | 34 | 29 | 21 |
| Estimated value based on formula (1) | (%) | 71 | 70 | 64 | 60 | 55 | 44 | 30 | 28 | 25 |

The following three additional Examples were performed similarly as in the above Examples 1-9 to obtain respective PGA pellets.

Example 10

The PGA pulverizate obtained in PGA Synthesis Example 1 was pelletized according to the method of PGA Extrusion Example 1 to obtain PGA pellets.

The thus-obtained PGA pellets exhibited a terminal carboxyl group concentration of 2 eq./ton and a glycolide content of 0.25 wt. %. In order to obtain a PGA product showing a molecular weight-retentivity of 60%, the PGA pellets were heat-treated for 12 hours according to Heat treatment method 2. The PGA product after the heat treatment exhibited a terminal carboxyl group concentration, a glycolide content, a total COOH concentration and a molecular weight retentivity after 3 days in 50° C. and 80% RH evaluated according to the

[Table 2]

TABLE 2

| Example | | 10 | 11 | 12 |
|---|---|---|---|---|
| Glycolide content | (wt. %) | 0.15 | 0.05 | 0.19 |
| Terminal carboxyl group concentration | (eq./t) | 2 | 7 | 7 |
| Total carboxyl group concentration | (eq./t) | 10 | 10 | 17 |
| Initial molecular weight (Mw) | ($\times 10^4$) | 25.8 | 25.8 | 25.8 |
| Molecular weight after 3 days (Mw) | ($\times 10^4$) | 15.5 | 15.7 | 12.1 |
| Molecular weight retentivity (measured) | (%) | 60 | 61 | 47 |
| Estimated value based on formula (1) | (%) | 60 | 60 | 51 |

As described above, according to the present invention, it has become possible to control at a good accuracy the moisture resistance of polyglycolic acid resin which exhibits a large initial strength and a noticeable hydrolyzability, by controlling a total carboxyl group concentration including a contribution of residual glycolide governing the hydrolyzability (moisture resistance) thereof. As a result, it has become possible to better control a change of strength with time of polyglycolic acid resin in an environment of use, so that the value of use of polyglycolic acid resin as a biodegradable resin can be increased.

The invention claimed is:

1. A method of estimating a moisture resistance of polyglycolic acid resin, comprising the steps of:
    measuring a glycolide content (wt. %) in a sample polyglycolic acid resin by subjecting a solution of the sample polyglycolic acid resin to gas chromatography;
    measuring a terminal carboxyl group concentration (equivalent/ton) of the sample polyglycolic acid resin by titrating a solution of the polyglycolic acid resin with sodium hydroxide;
    calculating a total carboxyl group-source concentration X (equivalent/ton) in the polyglycolic acid resin according to formula (2) below:

$X$=the measured glycolide content (wt. %)×54+the measured terminal carboxyl group concentration (equivalent/ton) (2);

calculating a molecular weight retentivity Y (%) after standing for 3 days in an environment of 50° C. and 90% relative humidity according to formula (1) below:

$Y=0.011X^2-1.5X+74$; (1); and estimating the moisture resistance of the polyglycolic acid resin in terms of the calculated molecular weight retentivity Y (%).

2. A method according to claim 1, further comprising the step of controlling the moisture resistance of the polyglycolic acid resin so as to provide an objective value Y (%) according to the formula (1).

3. A method according to claim 2, wherein the step of controlling the moisture resistance comprises controlling a total carboxyl group-source concentration including a contribution of residual glycolide.

4. A method according to claim 3, wherein the residual glycolide in the polyglycolic acid resin is controlled so as to be decreased by adding a thermal stabilizer.

5. A method according to claim 4, wherein the thermal stabilizer is at least one species selected from the group consisting of phosphoric acid esters having a pentaerythritol skeleton, and alkyl phosphates and alkyl phosphites each having an alkyl group of 8-24 carbon atoms.

6. A method according to claim 4, wherein the thermal stabilizer is added in a proportion of at most 3 wt. parts per 100 wt. parts of the polyglycolic acid resin.

7. A method according to claim 3, wherein controlling the total carboxyl group-source concentration comprises decreasing the terminal carboxyl group concentration by adding a carboxyl group-capping agent.

8. A method according to claim 7, wherein the carboxyl group-capping agent is a carbodiimide compound or an epoxy compound.

9. A method according to claim 7, wherein the carboxyl group-capping agent is added in a proportion of 0.1-10 wt. parts per 100 wt. parts of the polyglycolic acid resin.

10. A method according to claim 2, wherein the moisture resistance is further controlled so as to be enhanced by increasing a crystallinity of the polyglycolic acid resin.

11. A method according to claim 2, wherein the moisture resistance is further controlled so as to be enhanced by increasing a molecular orientation of the polyglycolic acid resin.

12. A method according to claim 5, wherein the thermal stabilizer is added in a proportion of at most 3 wt. parts per 100 wt. parts of the polyglycolic acid resin.

13. A method according to claim 8, wherein the carboxyl group-capping agent is added in a proportion of 0.1-10 wt. parts per 100 wt. parts of the polyglycolic acid resin.

* * * * *